(12) United States Patent
Groner

(10) Patent No.: US 6,507,643 B1
(45) Date of Patent: Jan. 14, 2003

(54) SPEECH RECOGNITION SYSTEM AND METHOD FOR CONVERTING VOICE MAIL MESSAGES TO ELECTRONIC MAIL MESSAGES

(75) Inventor: Gabriel F. Groner, Palo Alto, CA (US)

(73) Assignee: Breveon Incorporated, Mountain View, CA (US)

( * ) Notice: Subject to any disclaimer, the term of this patent is extended or adjusted under 35 U.S.C. 154(b) by 0 days.

(21) Appl. No.: 09/526,807

(22) Filed: Mar. 16, 2000

(51) Int. Cl.$^7$ .............................................. H04M 11/00

(52) U.S. Cl. ..................... 379/88.14; 704/231; 709/206

(58) Field of Search ........................... 379/88.01, 88.04, 379/88.11, 88.12, 88.13, 88.14, 88.16, 88.17, 88.22, 88.23, 88.25; 704/231, 275; 709/206

(56) References Cited

U.S. PATENT DOCUMENTS

| | | | |
|---|---|---|---|
| 4,640,991 A | | 2/1987 | Matthews et al. |
| 4,856,066 A | * | 8/1989 | Lemelson .................... 704/275 |
| 4,972,462 A | | 11/1990 | Shibata |
| 4,996,707 A | | 2/1991 | O'Malley et al. |
| 5,475,738 A | | 12/1995 | Penzias |
| 5,479,491 A | | 12/1995 | Herrero Garcia et al. |
| 5,483,580 A | | 1/1996 | Bradman et al. |
| 5,632,002 A | * | 5/1997 | Hashimoto et al. ......... 704/231 |
| 5,634,084 A | | 5/1997 | Malsheen et al. |
| 5,675,507 A | | 10/1997 | Bobo et al. |
| 5,745,776 A | * | 4/1998 | Sheppard, II ................ 707/532 |
| 5,870,454 A | * | 2/1999 | Dahlen ..................... 379/88.14 |
| 5,943,400 A | | 8/1999 | Park |
| 6,031,895 A | * | 2/2000 | Cohn et al. ............... 379/88.13 |
| 6,072,862 A | * | 6/2000 | Srinivasan ............. 379/100.08 |
| 6,075,844 A | * | 6/2000 | Goldberg et al. ........ 379/88.17 |

OTHER PUBLICATIONS

CTL Press, (Jan. 17, 2000), "CTL Begins Shipping Voice-Support NT, its new Widows NT®–based voice processing system," 1–1, www/ctline.com/press.htm.

eFax.com. (2000), "Retrieve Voice Messages from Email,"1–1, www/efax.com/help/voice_from_email. Accessed on Feb. 24, 2000.

eFax.com. (2000), "Retrieve Voice Messages from Email," 1–1, www/efax.com/help/Voice_from_email. Accessed on Feb. 22, 2000.

CTL Inc. (1998), "Welcome to CTL," 1–1, www/ctline.com. Accessed on Feb. 22, 2000.

Speech Machines (1999, 2000), "CyberTranscriber for Business: Speech–to–Text Capabilities," 1–2, www/cybertranscriber.com/gbs/gbs2_0.asp. Accessed on Feb. 22, 2000.

Onebox.com, (2000), "Free Voicemail, Email and Fax—All in One Place!," 1 page, www/onebox.com. Accessed on Feb. 23, 2000.

(List continued on next page.)

*Primary Examiner*—Fan Tsang
*Assistant Examiner*—Roland G. Foster
(74) *Attorney, Agent, or Firm*—Pennie & Edmonds LLP

(57) ABSTRACT

The present invention relates generally to speech recognition systems as applied to voice and electronic message mailing. More particularly the invention is a system and method for converting speech to a text message suitable for sending as an e-mail message and for viewing on a text display device. After an audio message from a caller is received, a text message file is generated and sent to the intended recipient's e-mail address, which has been stored prior to the receipt of the audio message. If the caller is identified, a caller-specific voice file may be used to facilitate speech recognition for generation of the text message file. Also, if the caller specifies a subject for the message, a specialized vocabulary file may be used to facilitate the generation of the text message file.

18 Claims, 12 Drawing Sheets

OTHER PUBLICATIONS

Onebox.com, (2000), "Free Voicemail, Email & Fax—What You Get," 1 page, www/onebox.com/service/index.html. Accessed on Feb. 23, 2000.

Onebox.com, (2000), "Receiving Messages—How It Works," 1 page, www/onebox.com/service/receiving.html. Accessed on Feb. 23, 2000.

Onebox.com, (2000), "Retrieving Messages—How It Works," 1 page, www/onebox.com/service/retrieving.html. Accessed on Feb. 23, 2000.

Onebox.com, (2000), "Sending Messages—How It Works," 1 page, www/onebox.com/service/sending.html. Accessed on Feb. 23, 2000.

Onebox.com, (2000), "Hear a Voicemail on the Web!—Hear Voicemail Now," 1 page, www/onebox.com/service/hearit1.html. Accessed on Feb. 23, 2000.

Onebox.com, (2000), "Inbox—QuickTour," 1 page, www/onebox.com/service/tour_inbox.html. Accessed on Feb. 23, 2000.

Onebox.com, (2000), "Voicemail—QuickTour," 1 page, www/onebox.com/service/tour_voicemail.html. Accessed on Feb. 23, 2000.

Onebox.com, (2000), "Email—QuickTour," 1 page, www/onebox.com/service/tour_email.html. Accessed on Feb. 23, 2000.

Onebox.com, (2000), "Fax—QuickTour," 2 pages, www/onebox.com/service/tour_fax.html. Accessed on Feb. 23, 2000.

Onebox.com, (2000), "Compose a Voice Email—QuickTour," 1 page, www/onebox.com/service/tour_composevoicemail.html. Accessed on Feb. 23, 2000.

Onebox.com, (2000), "Compose an Email—QuickTour," 1 page, www/onebox.com/service/tour_composeemail.html. Accessed on Feb. 23, 2000.

* cited by examiner

170

| To: | Recipient's Email Address | 172 |
| Subject: | Caller's Subject | 174 |
| From: | Caller's name | 176 |

Message:   Attachment: ☐ — 180

*Caller's Name* can be reached at *Caller's Callback Tel. #*, *Caller's Available Times*.

*Caller's Text Message* — 178

| To: | MSMITH@Email.com | 182 |
| Subject: | Lunch | 184 |
| From: | Tom Jones | 186 |

Message:   Attachment: [X] — 190

Tom Jones can be reached at 408-555-1212, evenings.

Hi Mary,
Please call to let me know when you can get together for lunch. — 188

FIG. 7

| Recipient (1) telephone number | 202-1 |
| Recipient (1) name | 204-1 |
| Recipient (1) e-mail address | 206-1 |
| ... | |
| Recipient (N) telephone number | 202-2 |
| Recipient (N) name | 204-2 |
| Recipient (N) e-mail address | 206-2 |

E-mail Address Data Structure

FIG. 9

| 214-1 | Call ID #(1) | ... | Call ID #(N) | 214-2 |
| 216-1 | Message Sent? (1) | ... | Message Sent? (N) | 216-2 |
| 218-1 | Recipient's Name (1) | ... | Recipient's Name (N) | 218-2 |
| 220-1 | Recipient's Email Address (1) | ... | Recipient's Email Address (N) | 220-2 |
| 222-1 | Caller's Name (1) | ... | Caller's Name (N) | 222-2 |
| 224-1 | Caller's Subject (1) | ... | Caller's Subject (N) | 224-2 |
| 226-1 | Caller's Callback Tel. # (1) | ... | Caller's Callback Tel. # (N) | 226-2 |
| 228-1 | Caller's Available Times (1) | ... | Caller's Available Times (N) | 228-2 |

FIG. 10

SPEECH RECOGNITION SYSTEM AND METHOD FOR CONVERTING VOICE MAIL MESSAGES TO ELECTRONIC MAIL MESSAGES

The present invention relates generally to speech recognition systems as applied to voice and electronic message mailing, and particularly to a system and method for converting speech to a text message suitable for sending as an e-mail message and for viewing on a text display device.

BACKGROUND OF THE INVENTION

Conventional voice mail systems, for example as disclosed in U.S. Pat. No. 4,640,991, to Mathews et al., and Internet-based voice mail systems, such as OneBox.com, combine telecommunications and computer technologies to enable callers to conveniently create and store voice messages for later receipt by recipients. When a caller calls an intended recipient who is a subscriber to such a system, and the recipient does not answer the telephone, the caller is transferred automatically to the voice mail system. The voice mail system enables the caller to record a message for the subscriber in the caller's own voice, which the voice mail system stores in electronic, usually digital, form. Many voice mail systems give the caller the opportunity to review, then save, delete or replace the current message. When the recipient calls the voice mail system, the voice mail system notifies the recipient of any stored messages, and enables the recipient to listen to the stored messages. Many voice mail systems enable the recipient to replay, delete or archive messages.

Electronic mail systems, which typically operate on the Internet and other computer networks, provide similar functions, but applied to electronic text messages. To use an electronic mail system, a sender composes a text message, usually at a personal computer, computer terminal or "mailstation," then requests the electronic mail system to send the message to recipients at their electronic mail addresses. In addition to text, the message may include other forms of information, such as graphics, digitized images and voice recordings, either directly as part of the message or as attachments. The sender's system forwards the messages, with electronic mail addresses attached, to the recipients' electronic mail systems. Recipients, who may be subscribers to the same electronic mail system or others, connect to the electronic mail systems with personal computers, computer terminals, mailstations, personal digital assistants, wireless phones and other devices capable of viewing electronic mail messages. The electronic mail system notifies the recipient of any stored messages, and enables the recipient to view, delete or archive messages, forward messages to other recipients, or reply to the sender.

Multimedia mail systems also provide similar functions, but for both voice mail and electronic mail (see U.S. Pat. No. 4,972,462 to Shibata), for both voice mail and facsimiles (see U.S. Pat. No. 5,483,580 to Brandman et al., U.S. Pat. No. 5,675,507 to Bobo and U.S. Pat. No. 5,943,400 to Park), and for voice mail, electronic mail and facsimiles, for example OneBox.com, eFax.com, jFax.com, respectively. Existing multimedia systems receive, process, store and provide access to multiple media, but handle each medium separately. These multimedia systems provide recipients with listings that include messages of all types, but do not convert one type of message to another. For example, the aforementioned multimedia systems do not convert voice mail messages or facsimiles to text messages.

U.S. Pat. No. 4,996,707 to O'Malley et al. describes a system that receives facsimiles, uses stored and text-to-speech voice messages to notify remote recipients over the telephone network about the availability of facsimiles, converts facsimile images to characters, and uses text-to-speech to convert those characters to spoken words. Another system, disclosed in U.S. Pat. No. 5,634,084 to Malsheen et al., uses text-to-speech to convert the text of electronic mail messages to spoken words, so the messages can be accessed over the telephone network without the need for additional devices.

In an information processing system disclosed in U.S. Pat. No. 5,479,491 to Garcia et al., speech recognition is used to interpret verbal commands spoken by a caller to access voice mail and other services.

Different media are advantageous in different circumstances. Voice mail messages and voice output from facsimiles and electronic mail messages are convenient because telephones are ubiquitous and inexpensive. Voice also conveys personality and emotion.

However, electronic mail messages can be advantageous. Compared to over-the-telephone voice mail, electronic mail avoids long distance telephone charges, and compared to Internet-voice mail, much less data is transmitted and stored. Furthermore, text messages can be displayed on simple, inexpensive devices such as personal digital assistants, mailstations, pagers, wireless phones and other Internet-connected devices. In addition, electronic mail systems can provide, at very low cost, a record of messages sent and received. Text messages can be searched easily for content whereas voice messages cannot be as easily searched. Text messages can be read by deaf people and by people who have difficulty understanding the same language when spoken. Another advantage is that electronic mail systems provide message directories that can be organized and visually scanned, whereas voice mail systems typically require subscribers to listen to sequential lists.

The accuracy of speech recognition software has improved. Present (circa 2000) continuous speech recognition software offered by such vendors as Nuance, Philips and SpeechWorks accurately recognize tens of thousands of words spoken over the telephone by most any caller, as long as the caller speaks about a specific topic such as trading stocks or ordering airline tickets. Furthermore, continuous speech recognition software offered by such vendors as Dragon Systems, IBM, Lernout and Hauspie, and Philips accurately recognizes dictations about topics as broad as business, healthcare and law. This software works best when users have previously provided voice samples, and when the speech to be recognized is not distorted or mixed with noise. The speech recognition software works with degradation for anyone who speaks clearly, even over telephone networks.

Therefore there is a need for a system and method that uses speech recognition software to automatically convert voice messages into text messages suitable for sending as e-mail messages and for viewing on a display devices. The system and method should provide sufficient accuracy when converting the voice messages, even when voice samples have not been provided.

SUMMARY OF THE INVENTION

An audio message from a caller for a recipient is received. An e-mail address for the recipient is determined. A text message file is generated from the audio message from the caller. The text message file is sent to the recipient at the recipient's e-mail address.

In another embodiment, a voice-to-electronic mail computer system allows a caller to dictate a message, stores the dictated message as a voice message, and, while the caller is dictating the message, uses continuous speech recognition to convert the voice message to text. In one embodiment, the speech recognition software refers to a data structure that stores callers' speech characteristics. In another embodiment, the speech recognition software refers to a data structure that stores specialized vocabularies. In yet another embodiment, at the caller's option, the voice-to-electronic mail system uses text-to-speech conversion to read the text for verification. The caller may accept, replace, edit or discard the voice and text messages. Once accepted, the voice-to-electronic mail system uses the information stored about the message, namely, the caller's name, subject, where and when the caller can be reached, and the dictated text, to create a conventional electronic mail message, which the system forwards through use of an electronic mail system. In an alternate embodiment, the system also sends the caller's voice message as an attachment to the electronic mail message to allow the recipient to also listen to the original voice message. Using an ordinary electronic mail system and a simple, text display device, the recipient can select messages by sender and subject, and then display them. If the recipient's display device has audio capability, the recipient may also listen to the attached voice message to verify the text and to hear the caller's personality and emotion.

In this way, the present invention enables callers to dictate messages that recipients receive and read as text on simple text display devices. Recipients can organize and review voice messages by such categories as sender, subject and time rather than being limited to reviewing the messages in sequential order by time of receipt. Recipients can also readily access information such as time of receipt, and telephone numbers at which the recipient can reach the message senders. Because the voice messages are in text form, the voice messages can be searched for particular content. A record of voice and text messages created through use of an automated message service is provided, by sender, subject and time. In one embodiment, by sending text messages, rather than voice messages, the present invention reduces the amount of data that is transmitted and stored.

BRIEF DESCRIPTION OF THE DRAWINGS

Additional objects and features of the invention will be more readily apparent from the following detailed description and appended claims when taken in conjunction with the drawings, in which:

FIG. 6 is an exemplary format of an e-mail message on a recipient's display that was sent by the voice-to-electronic mail system of FIGS. 1 and 3.

FIG. 7 is an exemplary populated display of FIG. 6.

FIG. 9 depicts an exemplary e-mail address data structure of FIGS. 3 and 8.

FIG. 10 depicts an exemplary message header data structure of FIGS. 3 and 8.

DESCRIPTION OF THE PREFERRED EMBODIMENTS

Figure 1:
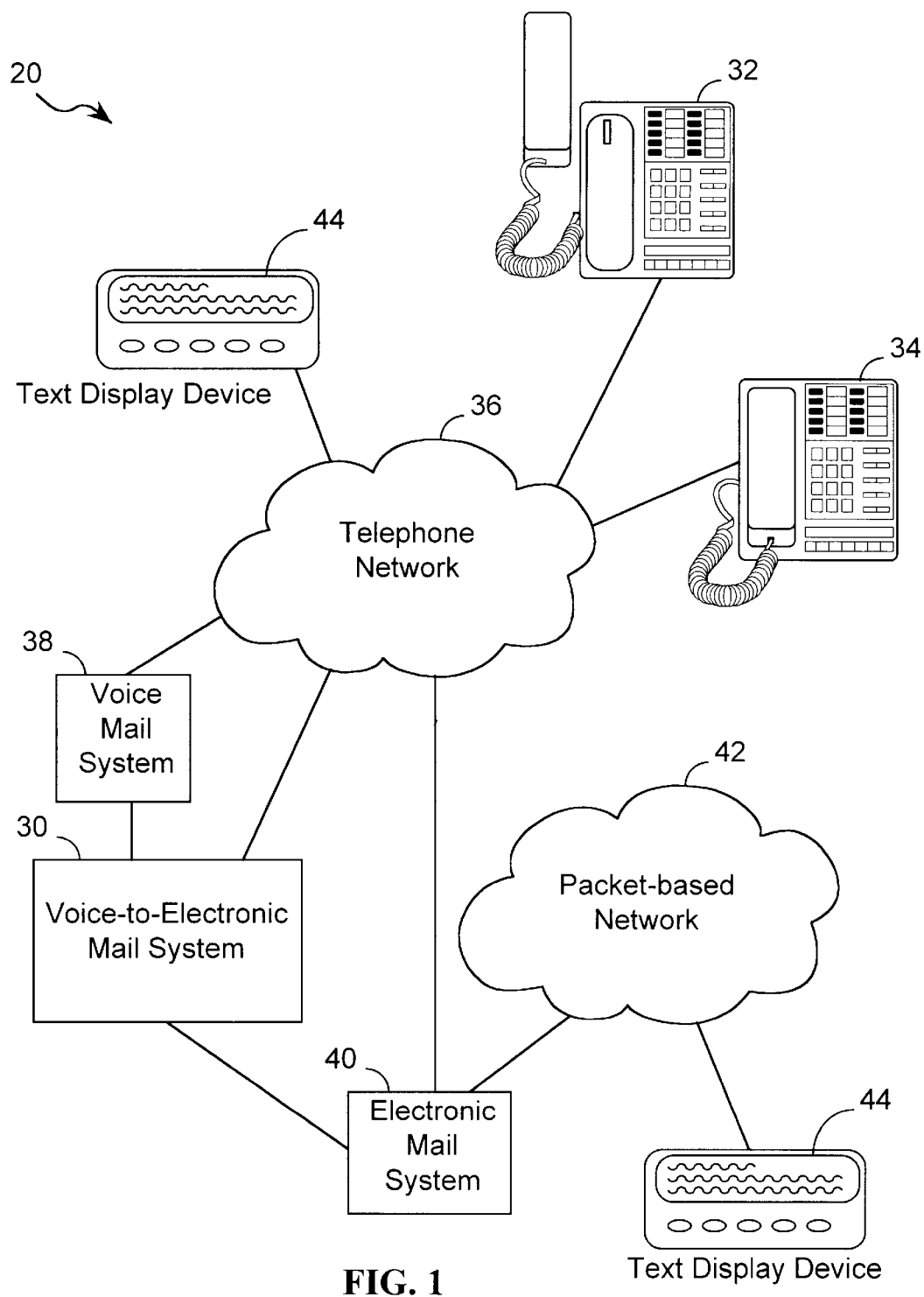
FIG. 1 is a diagram of a network that includes the voice-to-electronic mail system of the present invention.

Referring to FIG. 1, a network 20 includes the voice-to-electronic mail system 30 of the present invention. A caller uses a telephone 32 to call a recipient at another telephone 34 using a telephone network 36. In one embodiment, the telephone network 38 is the public switched telephone network (PSTN). Alternately, the telephone network is a private network. If the recipient answers the telephone, the caller and the recipient speak directly to one another, and voice-to-electronic mail system 30 is not used. If the recipient does not answer the call, the telephone network 36 routes the call to the recipient's voice mail system 38. The telephone network 36 provides call identification, including the called telephone number, to the voice-to-electronic mail system 30. The voice-to-electronic mail system 30 determines whether the recipient subscribes to the services of the voice-to-electronic mail system 30. If not, the voice-to-electronic mail system 30 switches the call to a voice mail system 38. If the called party subscribes to the voice-to-electronic mail system 30, the voice-to-electronic mail system 30 receives a voice message from the caller, converts the voice message to a text message, and sends the text message, as an electronic mail (e-mail) message, to the recipient via the electronic mail system 40. The electronic mail system 40 sends the e-mail message over the packet-based network 42 for display on the recipient's text display device 44. In one embodiment, the recipient's text display device 44 is connected to a packet-based network 42, such as the Internet. In an alternate embodiment, the packet-based network 42 is a private network, such as a local area network.

In another embodiment, to receive the e-mail messages, the electronic mail system 40 connects to the recipient's text display device 44 via the telephone network 36. For example, the recipient's text display device 44 may be associated with a telephone number, and the electronic mail system 40 calls that telephone number to send the text message to the recipient.

Figure 2:
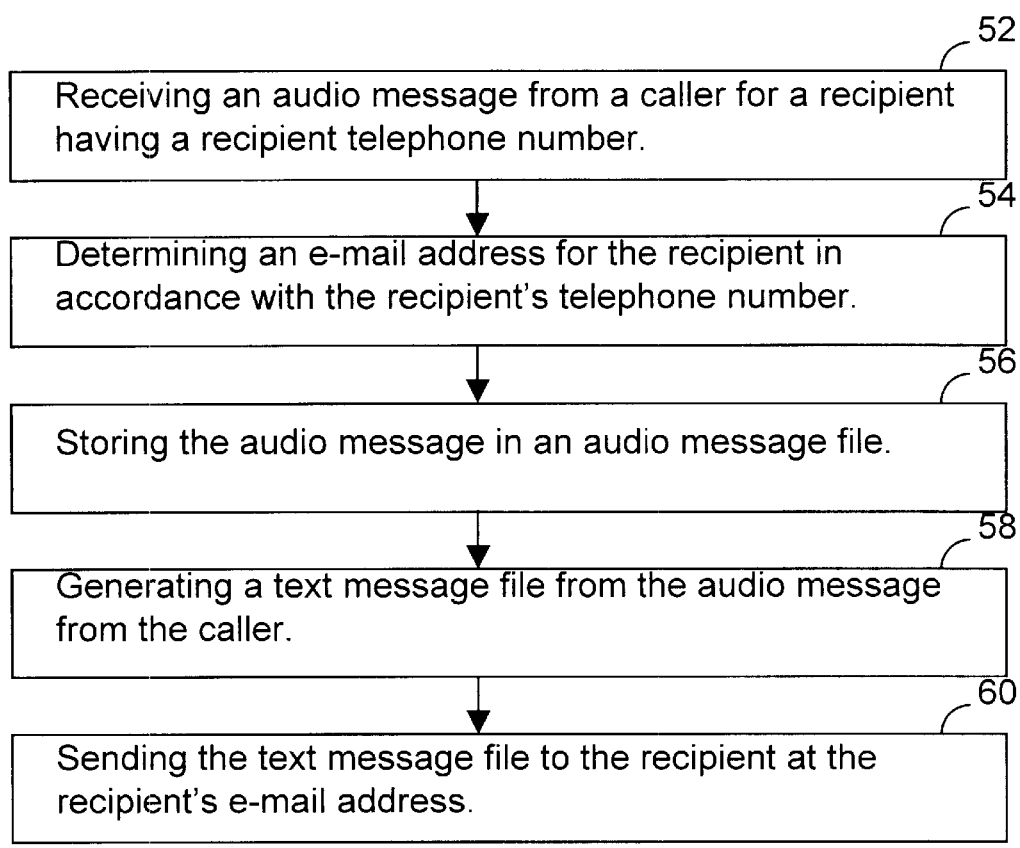
FIG. 2 is a flowchart showing the general operation of the voice-to-electronic mail system of FIG. 1 in accordance with an embodiment of the present invention.

Referring also to FIG. 2, a method of sending voice-to-electronic mail messages in accordance with an embodiment of the present invention is shown. In step 52, the voice-to-electronic mail system 30 receives a spoken message from a caller for a recipient having a recipient telephone number. The voice-to-electronic mail system 30 receives the audio message when the caller speaks. In step 54, the voice-to-electronic mail system 30 determines an e-mail address for the recipient in accordance with the recipient's telephone number. In step 56, the voice-to-electronic mail system 30 stores the spoken message in an audio message file. In step 58, the voice-to-electronic mail system 30 generates a text message file from the audio message from the caller. In one embodiment, steps 56 and 58 are performed concurrently. In step 60, the voice-to-electronic mail system 30 sends the text message file to the recipient at the recipient's e-mail address.

Figure 3:
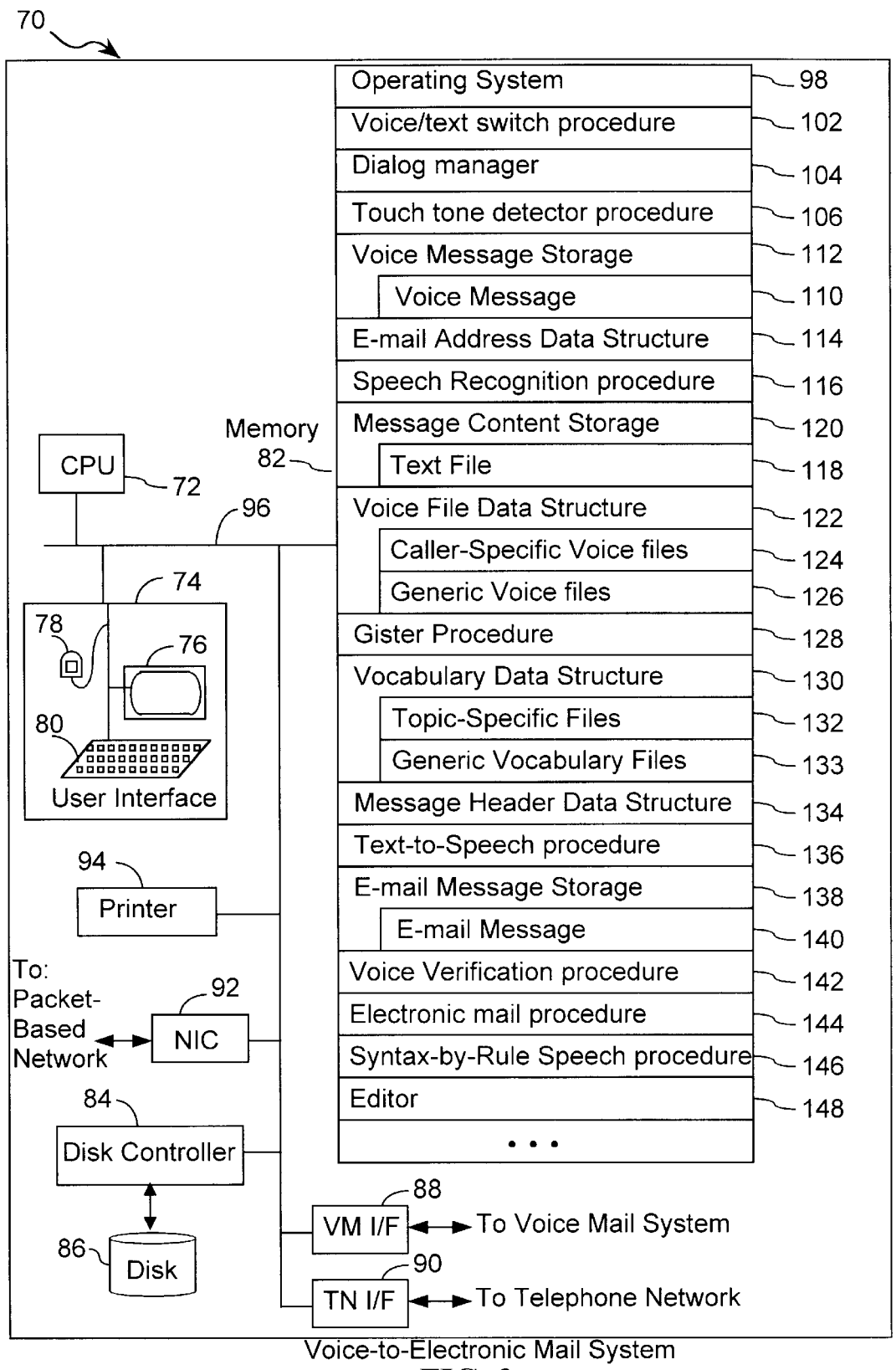
FIG. 3 is a block diagram of an embodiment of a computer system implementing the voice-to-electronic mail system of the present invention.

Referring to FIG. 3, a computer system 70 implements the voice-to-electronic mail system 30 (FIG. 1) in accordance with an embodiment of the present invention. The voice-to-electronic mail system 30 automatically converts a spoken message to a text message which is e-mailed to a recipient. The computer system 70 generates a text message file from a caller's voice message. The computer system 70 includes:

- a data processor (CPU) 72;
- a user interface 74, including a display 76, and one or more input devices, such as a mouse 78 and a keyboard 80;
- a memory 82, which may include random access memory as well as disk storage and other storage media;
- a disk controller 84 and disk drive 86 for retrieving information from and storing information to the disk drive 86; the information includes procedures and data;
- a voice mail system interface (VM I/F) 88 to transfer a call to the voice mail system;
- a telephone network (TN) interface 90 to receive a call from a caller;
- a network interface card (NIC) 92 that provides a packet-based interface for connecting to a remote server via a packet switched network such as the Internet; and
- one or more buses 96 for interconnecting the aforementioned elements of the computer system 70.

The memory 82 stores data structures and different programs, sometimes herein called procedures. The programs and procedures of the computer system 70 include instructions that are executed by the system's processor 72. In a typical implementation, the memory 82 includes:

- an operating system 98 that includes procedures for handling various basic system services and for performing hardware dependent tasks; the operating system 98 may include a set of user interface procedures for handling input received from the user interface 74 and displaying the output to the user on the display 76;
- a voice/text switch procedure 102 that determines whether a recipient is subscriber to the voice-to-electronic mail system 30 (FIG. 1); if the recipient is not a subscriber, the voice/text switch procedure 102 switches the call to the voice mail system 38 (FIG.1); if the recipient is a subscriber, the voice/text switch procedure 102 does not switch the call and the voice-to-electronic mail system 30 (FIG. 1) will further process the call;
- a dialog manager 104 that supervises the overall operation of the voice-to-electronic mail system in accordance with an embodiment of the present invention; the dialog manager 104 also conducts an interchange of prompts and responses with the caller to process the call; in addition, the dialog manager 104 stores audible signals, including spoken words, in a digitized audio format in a voice message 110 in the voice message storage 112; the dialog manager 104 is a software module having instructions for performing at least a subset of the steps shown in FIGS. 2,4, 5, and 11A–11E;
- a touch tone detector procedure 106 that identifies touch tone codes received from the telephone network interface 90;
- an e-mail address data structure 114 that stores recipient telephone numbers, names and e-mail addresses and will be discussed in further detail below with reference to FIG. 9; the e-mail address data structure 114 lists telephone numbers, names and electronic mail addresses for call recipients who wish to receive text messages corresponding to voice messages;
- a speech recognition procedure 116 that receives audio speech, identifies the audio speech and generates a text file 118 corresponding to the identified audio speech; the text file is stored in a message content storage 120;
- a voice file data structure 122, accessed by the speech recognition procedure 116, that stores caller-specific voice files 124 that describes vocal characteristics of frequent callers to help recognize their speech; the voice file data structure 122 also stores a generic voice file 126 that is used when a caller does not have a caller-specific description; reference to caller-specific voice files 124 enables the speech recognition procedure 116 to recognize speech with greater accuracy than using generic voice files 126;
- a topic gister procedure 128 to estimate the general topic of a subject using keyword searches and predefined rules;
- a vocabulary data structure 130, accessed by the speech recognition procedure 116, that provides lists of words, word pronunciations and statistical information about word usage; the vocabulary data structure 130 includes topic-specific vocabularies for specific topics; a topic-specific vocabulary is a set of topic-specific files 132 that include a list of words, word pronunciations and statistical information about word usage for a specific topic; the vocabulary data structure 130 also stores generic vocabulary files 133 that are used when a specific topic has not been identified;
- a message header data structure 134 that stores the caller's name, subject and e-mail address of the recipient;
- a text-to-speech procedure 136 that recites text; in particular the text-to-speech procedure 136 recites the contents of the text file 118;
- e-mail message storage 138 that stores e-mail messages 140 sent by the voiceto-electronic mail system 30 of the present invention;
- a voice verification procedure 142 to verify the identity of callers and attach verification notices to the electronic mail messages that are sent;
- a syntax-by-rule speech recognition procedure 144 to recognize predefined known categories of speech such as telephone numbers and times; and
- an editor 148 that allows a caller to edit both the voice messages 110 and text files 118.

Figure 4:
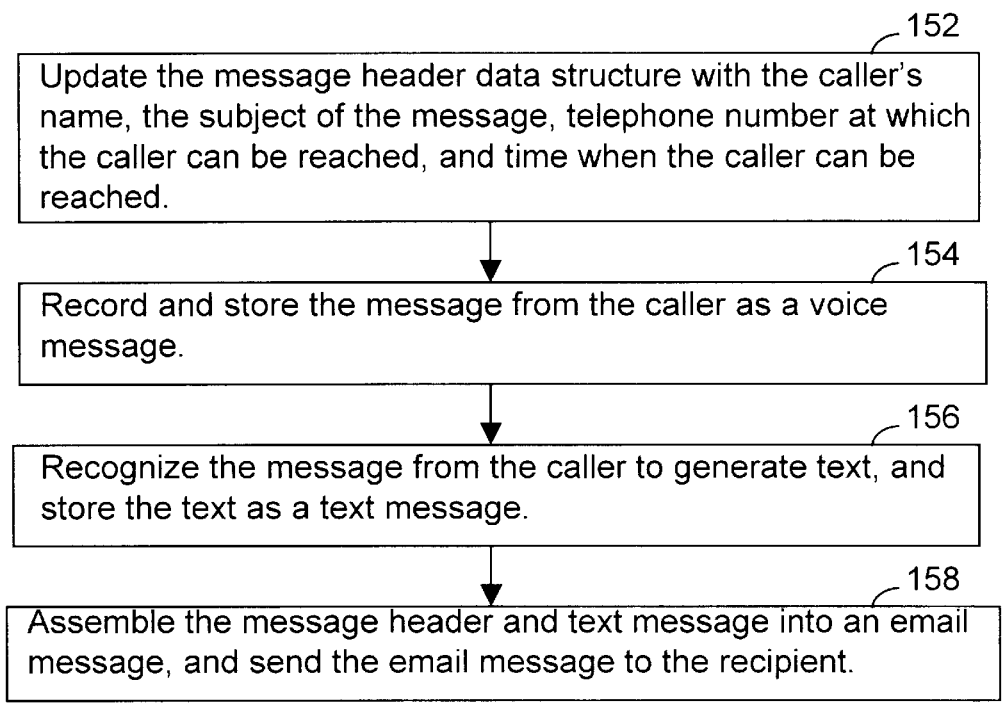
FIG. 4 is a flowchart of the operation of the voice-to-electronic mail system of FIG. 3.

FIG. 4 is a flowchart providing an overview of the operation of the computer system 70 (FIG. 3) implementing the voice-to-electronic mail system 30 of FIG. 1. Referring to both FIGS. 3 and 4, in step 152, after the system 70 receives a call as described above with respect to FIGS. 1 and 2, the dialog manager 104 updates the message header data structure 134 with the caller's name, the subject of the message, a telephone number at which the caller can be reached, and a time or range of times when the caller can be reached. Each of these items may be dictated by the caller in response to voice prompts by the system, converted from speech to text by the speech recognition procedure 116, and then stored in the message header data structure. Alternately, caller ID information associated with the received call may, when available, be used to determine the name and telephone number of the caller. In yet another embodiment, the caller's telephone number and the time at which the caller can be reached may be entered by the caller, in response to prompts, using the DTMF keys of the caller's telephone.

In step 154, the dialog manager 104 records and stores the message from the caller in a digitized voice message file 110 in the voice message storage 112. In step 156, the dialog manager 104 invokes the speech recognition procedure 116 to generate the text message of the text file 118 from the caller's message. Preferably, the speech recognition procedure 116 converts the voice message into text as the caller is speaking. In an alternate embodiment, the speech recognition procedure 116 generates text from the stored voice message 1 10 in the voice message storage 1 12. In step 158, the dialog manager 104 assembles the message header data structure 134 and text file 118 into an e-mail message 114, stores the e-mail message 140 in the e-mail message storage 138, and sends the e-mail message 140 to the recipient.

Figure 5:
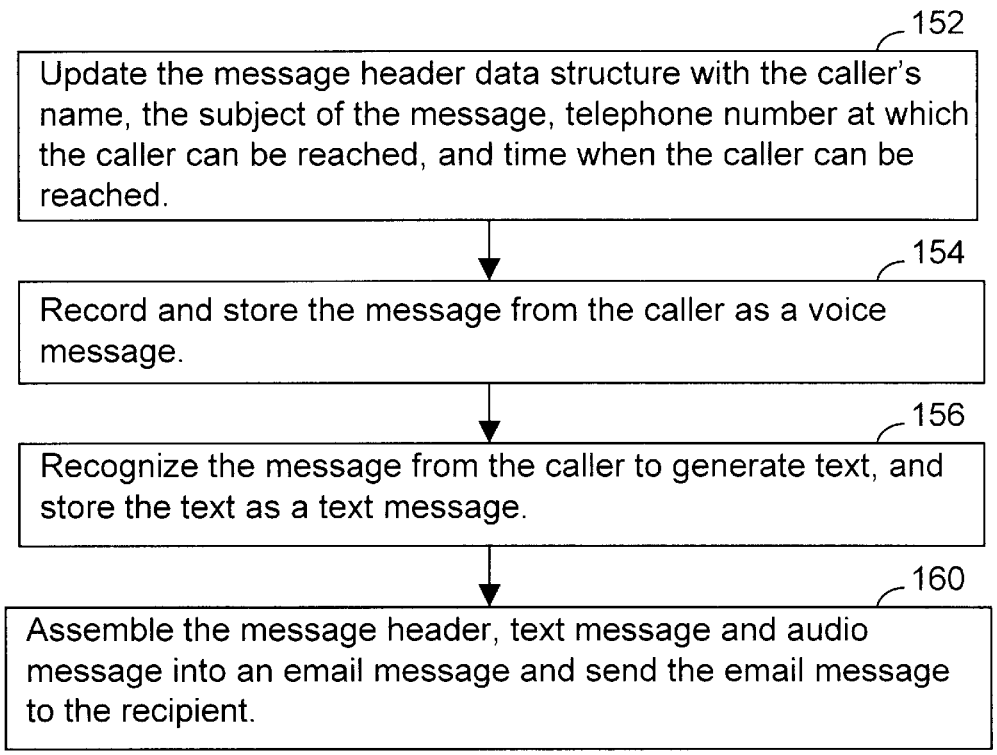
FIG. 5 is a flowchart of the operation of the voice-to-electronic mail system of FIG. 3 in accordance with an alternate embodiment of the present invention.

Referring to FIG. 5, in an alternate embodiment, the voice-to-electronic mail system 30 (FIG. 1) also sends the voice message to the subscriber so that the subscriber may hear the tone and emotion of the caller's voice, if desired. FIG. 5 is the same as FIG. 4 except for step 160. Referring also to FIG. 3, after performing steps 152,154 and 156, in step 160, the dialog manager 104 assembles the message header data structure 134, text file 118 and voice message 110 into the e-mail message 140 and sends the e-mail message 140 to the subscriber. In particular, the dialog manager 104 includes the voice message 110 as an attachment to the e-mail message 140.

FIG. 6 is an exemplary format of a display 170 of an e-mail message on a recipient's display that was sent by the voice-to-electronic mail system of the present invention. The message is addressed To Recipient's Email Address, about the Subject Callers Subject and From Caller's Name. A "To" field 172 displays the recipient's e-mail address. A "Subject" field 174 displays the subject of the e-mail message. A "From" field 176 displays the name of the caller. The dialog manager 104 populates the "To," "Subject," and "From" fields, 172,174 and 176, respectively, by retrieving the respective data from the message header data structure 134 (FIG. 3) for that call.

A "message" field 178 displays the text message from the caller. The dialog manager 104 (FIG. 3) automatically generates the first sentence of the message which appears as follows: "Caller's Name can be reached at Caller's Callback Telephone Number, Caller's Available Times. " At least a portion of the text message stored in the text file 118 follows the first sentence. An "attachment" checkbox 180 informs the recipient that the voice message 110 (FIG. 3) is attached, as an optional attachment, to the e-mail message 140 (FIG. 3). The recipient can play the attached voice message 110 (FIG. 3) at their convenience.

FIG. 7 shows the display of FIG. 6 with populated text. The "To," "Subject," and "From" fields 182, 184 and 186, respectively have been populated with specific text. The "message" field 188 displays the text message from the caller. An "x" in the "attachment" checkbox 190 indicates that the voice message 110 corresponding to at least a portion of the generated text has been included as an attachment.

Figure 8:
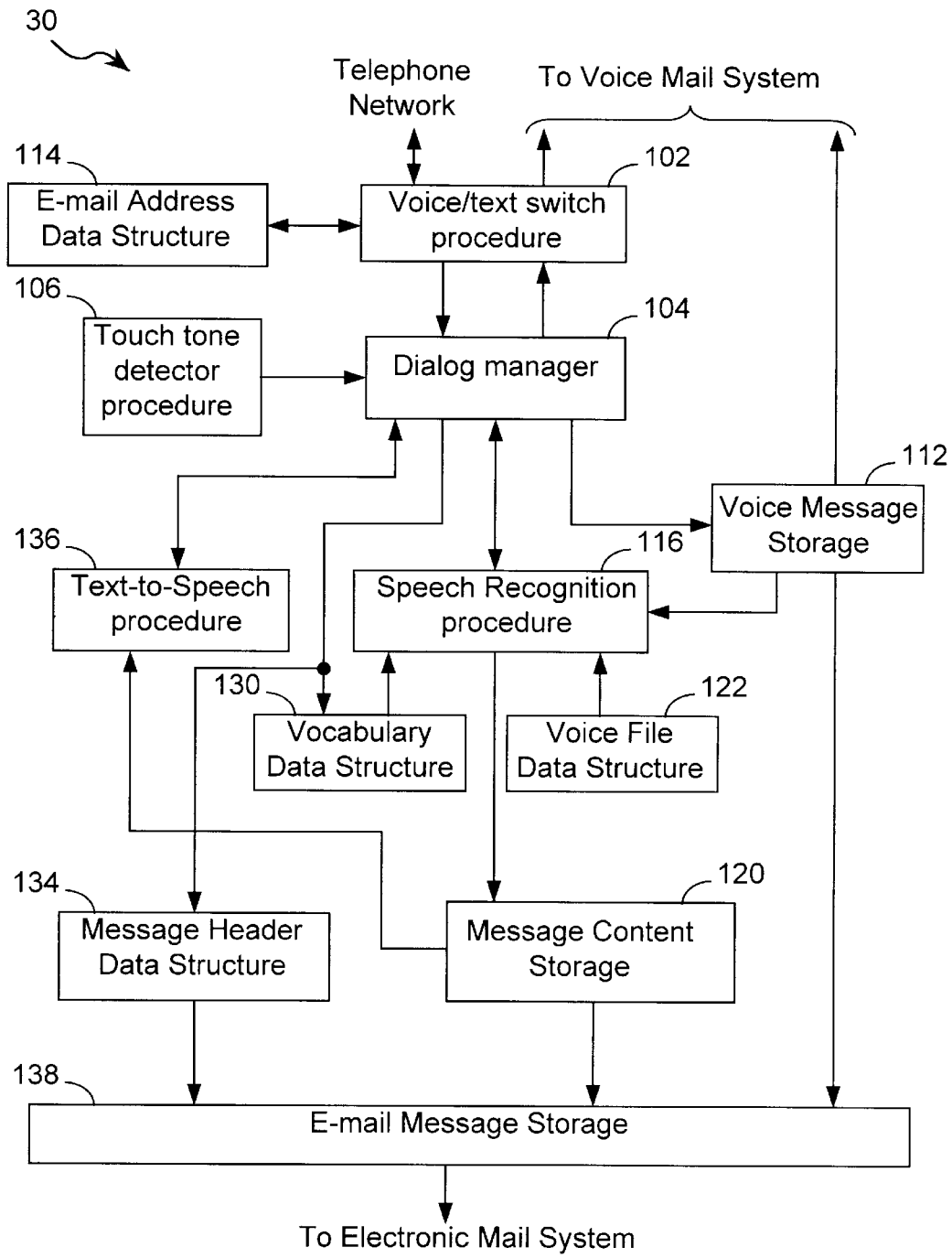
FIG. 8 is a diagram showing the interaction of the procedures and data of the voice-to-electronic mail system in accordance with an embodiment of the present invention.
Figure 11A:
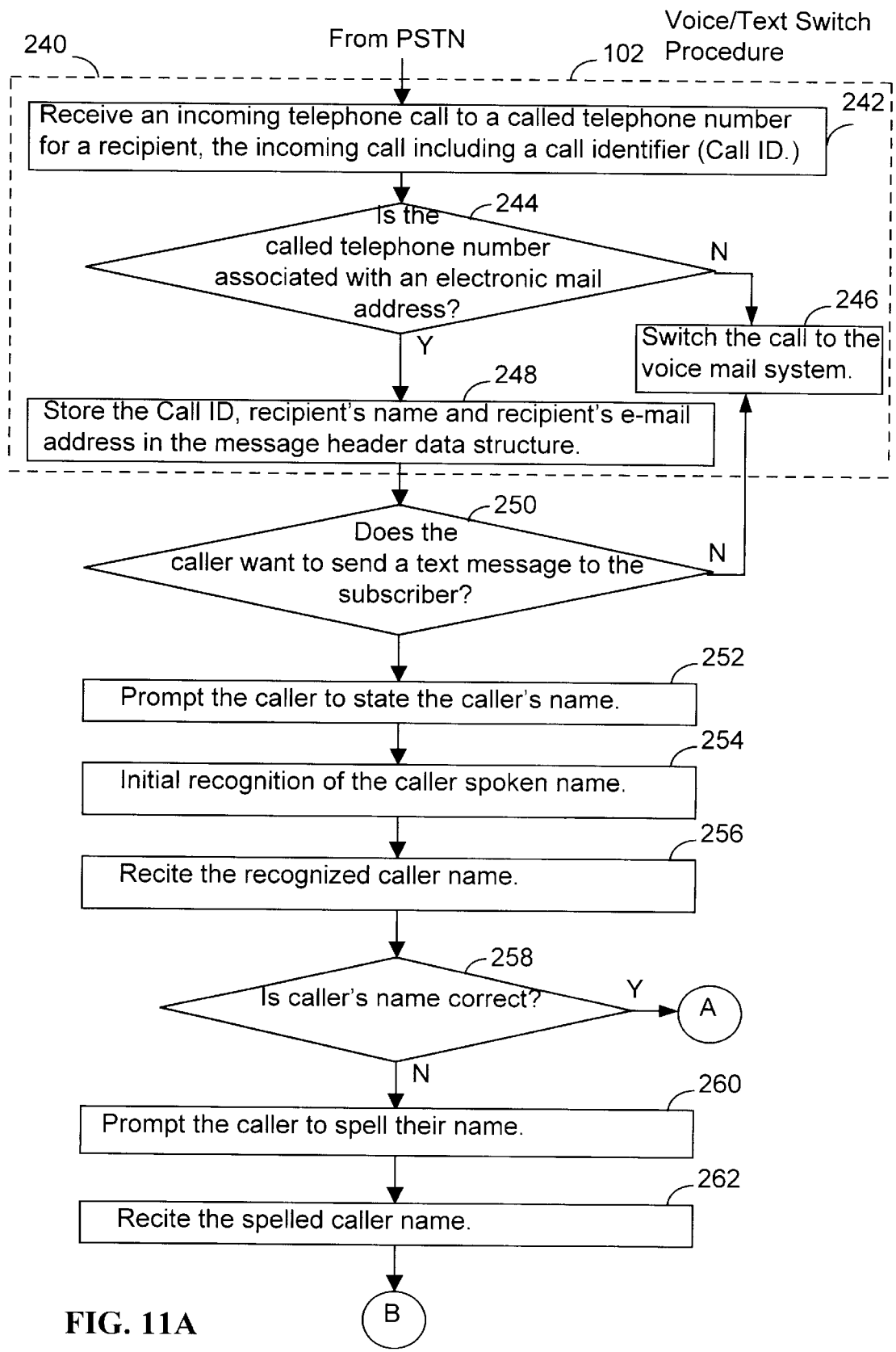
FIGS. 11A–11E are a detailed flowchart of a procedure for acquiring verbal message descriptors and content from a caller, using speech recognition software to recognize the verbal information, enabling the caller to verify and correct the recognized information, and creating and sending the resultant electronic mail message in accordance with an embodiment of the voice-to-electronic mail system FIGS. 3 and 8.
Figure 11B:
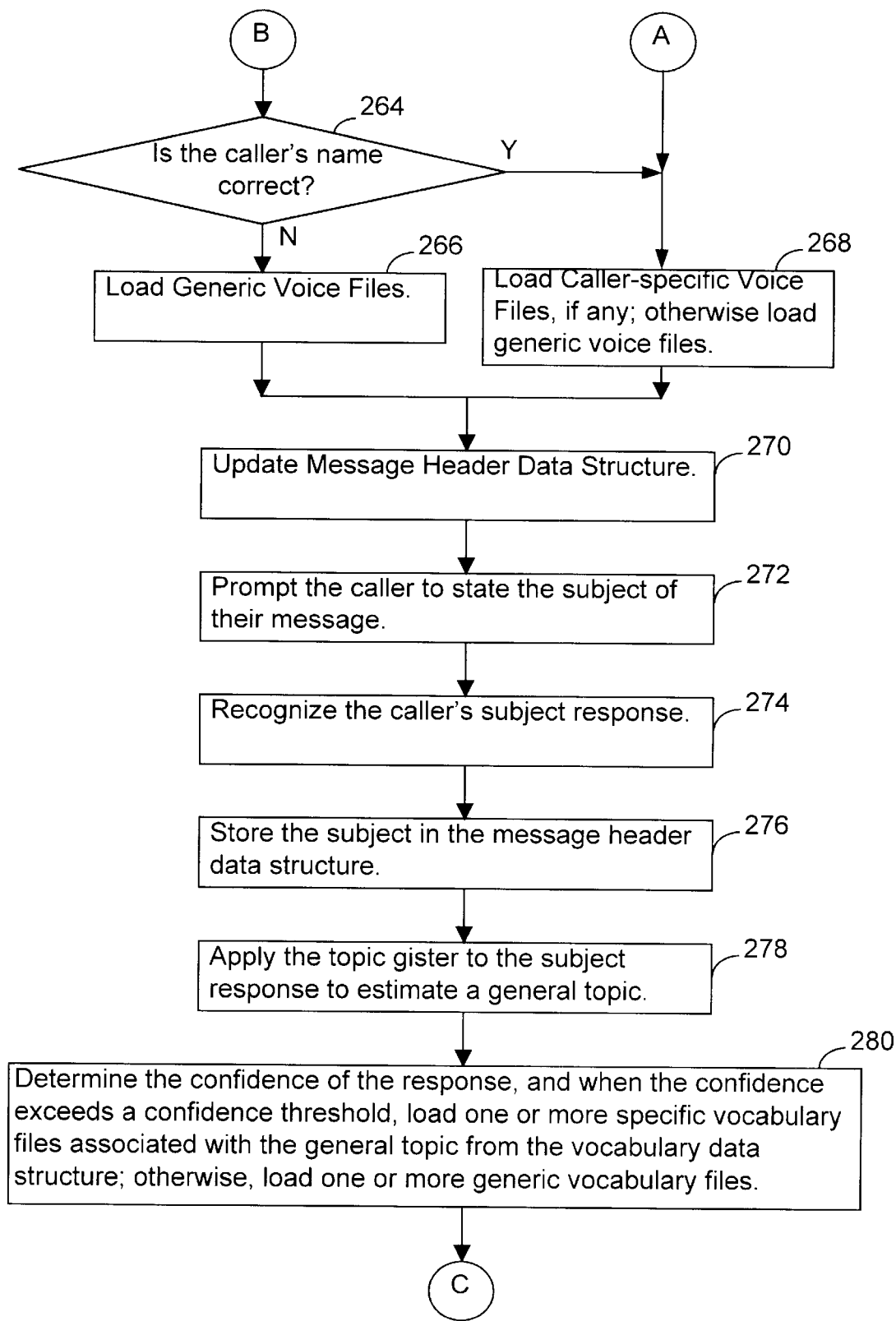
Figure 11C:
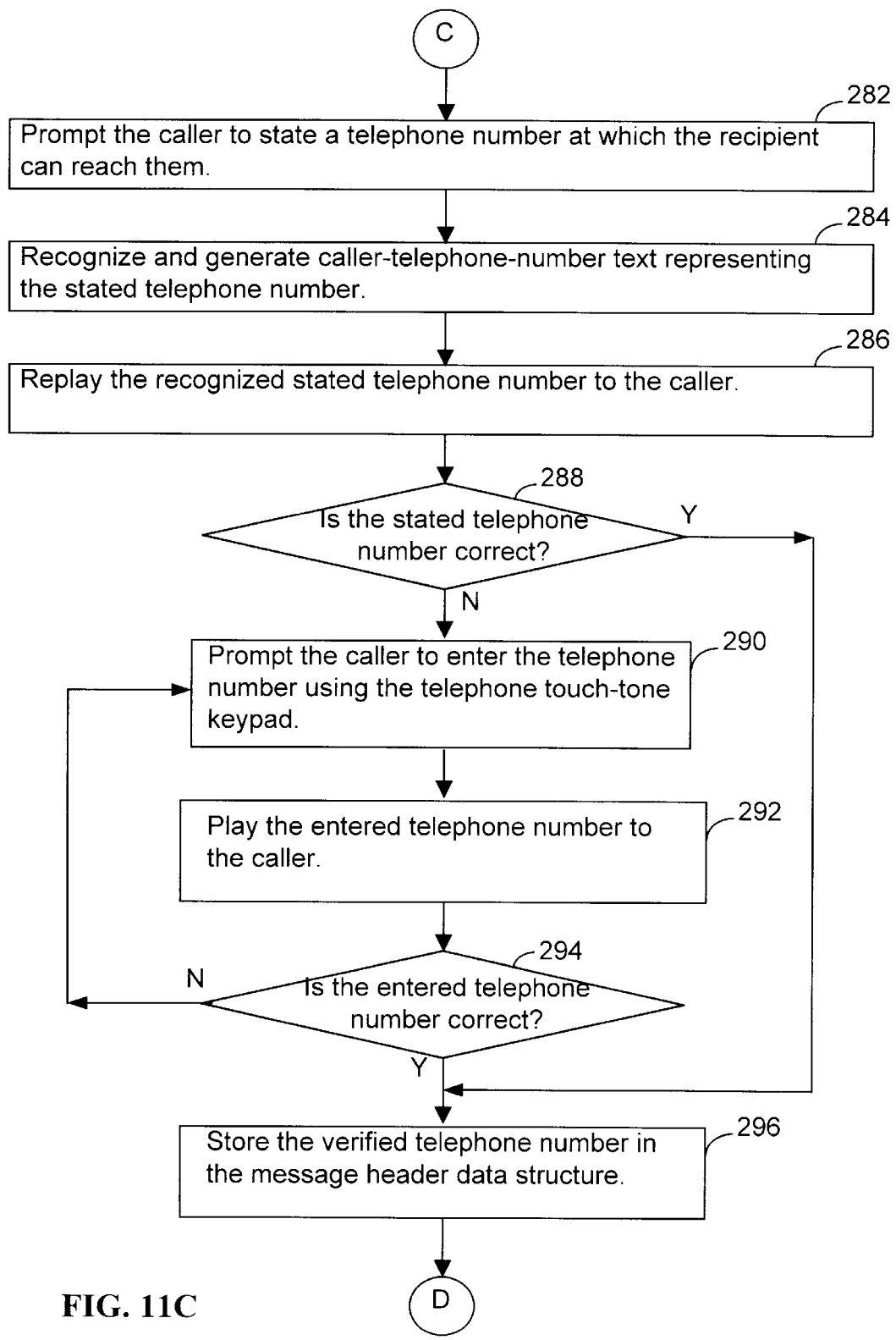
Figure 11D:
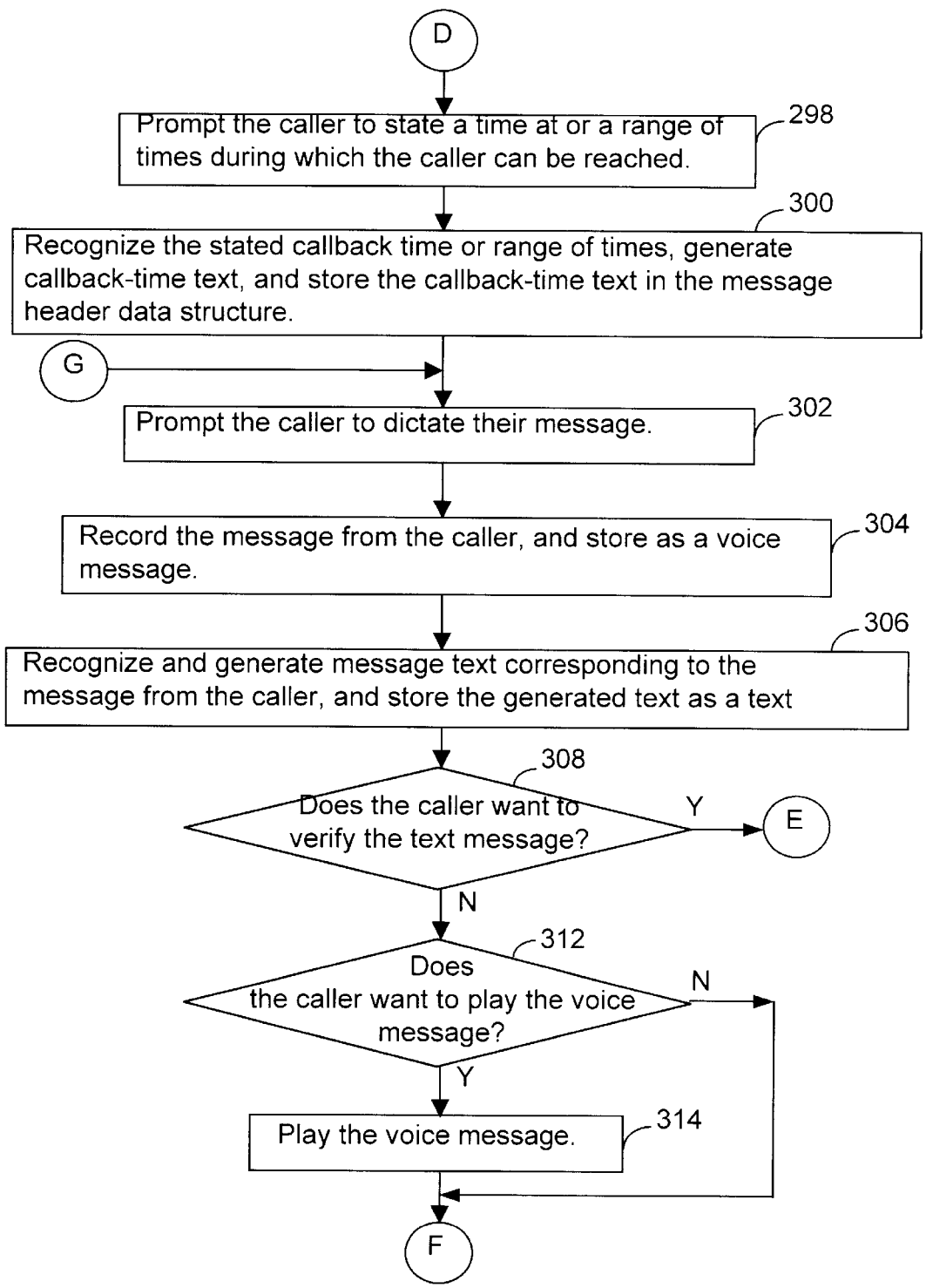
Figure 11E:
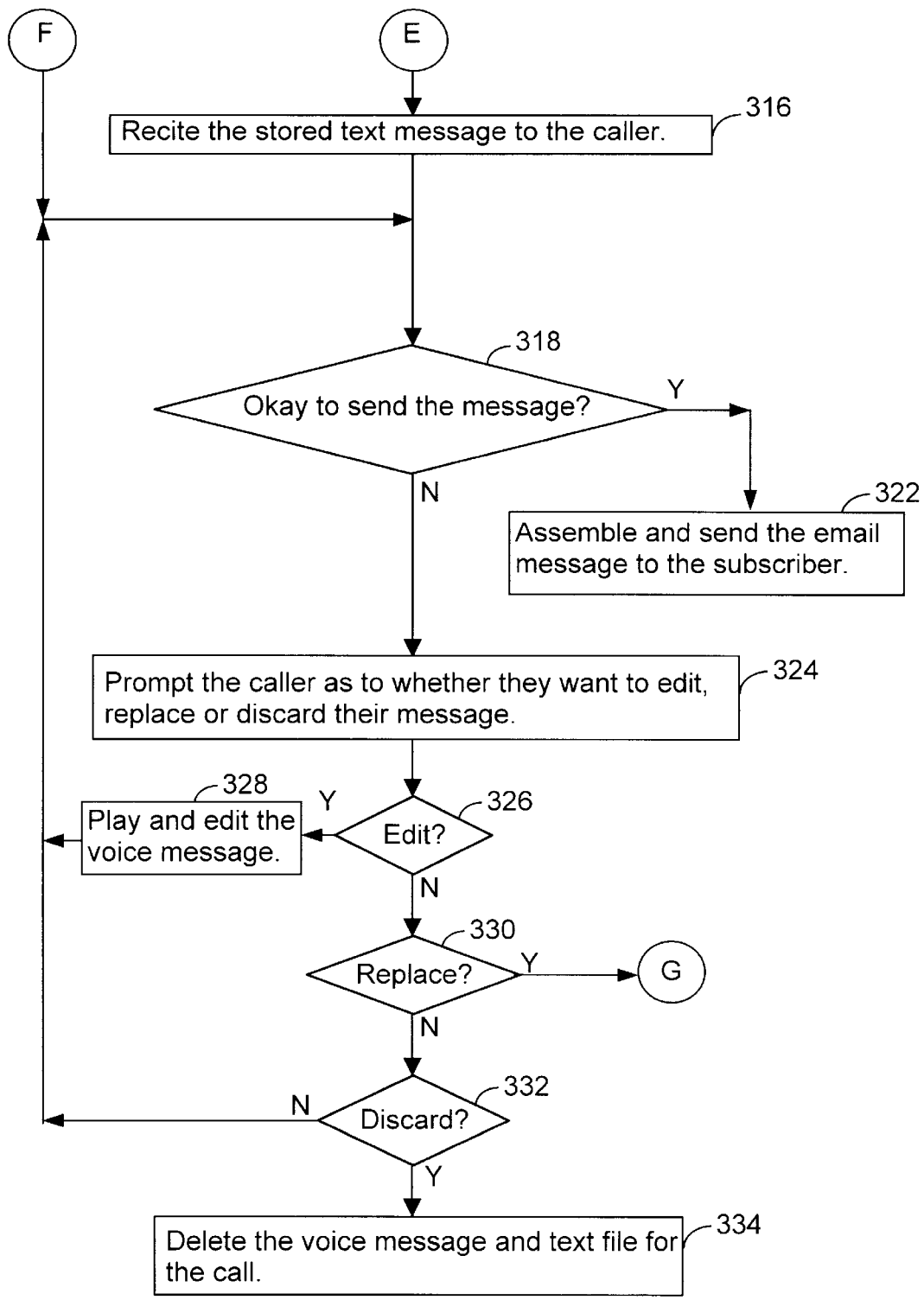

FIG. 8 shows the relationship among procedures and data in accordance with an embodiment of the voice-to-electronic mail system 30 of the present invention. The voice/text switch procedure 102 receives a call. The call includes additional information such as the recipient's telephone number, and the caller's telephone number.

Referring to FIG. 9, the electronic mail address data structure 114 stores telephone numbers, names and electronic mail addresses, 202, 204, 206, respectively, for call recipients who wish to receive text messages corresponding to voice messages.

Referring back to FIG. 8, the voice/text switch procedure 102 answers the call and searches for the recipient's telephone number in the electronic mail address data structure 114. If the voice/text switch procedure 102 does not find the recipient's telephone number in the electronic mail address data structure 114, the voice/text switch procedure 102 switches the call directly to the voice mail system 38 (FIG. 1), and the voice-to-electronic mail system 30 does no additional processing of the call. If the recipient's telephone number is listed in the electronic mail address data structure 114, the voice/text switch procedure 102 retrieves the recipient's name and electronic mail address from the electronic mail address data structure 114 and stores that information together with a call identification number in the message header data structure 134.

The dialog manager 104 next determines whether the caller wants to send a text message to the recipient by playing a message or prompt, such as "do you want to send a text message?" The dialog manager 104 accepts verbal and touch tone responses to the prompt. When the caller responds verbally, the dialog manager 104 uses the speech recognition procedure 116 to interpret the caller's response. When the caller responds by pressing a key on the telephone touch tone keypad, the dialog manager 104 uses the touch tone detector procedure 106 to interpret the response. If the caller's response indicates that the caller does not want to send a text message, the dialog manager 104 causes the voice/text switch procedure 102 to switch the call to the voice mail system 38 (FIG. 1). The voice-to-electronic mail system 30 performs no further processing of the call, terminates the interchange with the caller and becomes available for another call.

If the caller's response indicates that the caller wants to send a text message, the dialog manager 104 asks the caller to state their name, and uses the speech recognition procedure 116 to interpret the response to generate caller-name text corresponding to the caller's stated name. The dialog manager 104 stores the caller-name text in the message header data structure 134.

The dialog manager 104 causes the speech recognition procedure 116 to load voice files specific to this caller, if any, based on the caller's name. The caller-specific voice files describe how the caller speaks, and may have been stored in the voice file data structure 122. Using caller-specific voice files enables the speech recognition procedure 116 to recognize speech with greater accuracy than when using generic voice files. If the speech recognition procedure 116 finds the caller's name in the voice file data structure 122, the speech recognition procedure 116 loads the caller's caller-specific voice files. If the speech recognition procedure 116 does not find the caller's name in the voice file data structure 122, the speech recognition procedure 116 continues to use generic voice files that describe how a typical person speaks. For the remainder of the call, the speech recognition procedure 1 16 refers to the loaded voice files.

The dialog manager 104 next asks the caller for the subject of the message, and invokes the speech recognition procedure 116 to recognize the caller's response and generate text corresponding to the caller's subject. The dialog manager 104 stores the caller's subject in the message header data structure 134. Based on the caller's subject, the dialog manager 104 estimates a topic for the message. The estimated topic is used to select appropriate topic-specific vocabulary files, stored in the vocabulary data structure 130, to increase the accuracy of recognizing the text of the subsequent message. For example, if the subject is "set up meeting," the general topic may be "business," and if the subject is "patient consultation" the general topic may be "healthcare." If the dialog manager 104 estimates the general topic with a sufficiently high confidence level, the dialog manager 104 commands the speech recognition procedure 116 to load the specialized vocabulary for that topic. The specialized vocabulary is a set of data files that include a list of words, word pronunciations and statistical information about word usage, all specific to a topic. Reference to an appropriate specialized vocabulary enables the speech recognition procedure 116 to recognize speech with greater accuracy than when using a general vocabulary. The speech recognition procedure 116 searches the vocabulary data structure 130 for the requested specialized vocabulary, then loads and uses the corresponding files, if any are found. If the dialog manager 104 does not request a specialized vocabulary, or if the requested specialized vocabulary cannot be found in the vocabulary data structure 130, the speech recognition procedure 116 uses a general vocabulary such as general English.

To acquire the remainder of the information needed for the message header, the dialog manager 104 asks the caller for a callback telephone number and the time or range of times when the caller can be reached. The dialog manager 104 uses the speech recognition procedure 116 to generate text corresponding to the caller's response, and stores the text in the message header data structure 134.

In an alternate embodiment, the dialog manager 104 does not ask the caller whether the caller wants to send a text message. Instead, this determination is either made on a global basis, for instance where all subscribers of the service are to always receive text messages corresponding to the voice messages left by all callers, or based on subscriber specific information, such as subscriber profile information indicating times of the day or week at which voice mail messages are to be converted into text and sent to him/her as e-mail messages.

Referring also to FIG. 10, the message header data structure 134 stores the header information for the electronic mail messages. Each column 212 of the message header data structure 134 corresponds to a call identified by the caller's telephone number which is provided by the telephone network 36 in a call identification number (Call ID) 214. Typically the call identification number is a combination of the time and date of the call and the caller's telephone number. For example, for a call made from telephone number 408-555-1212 on Oct. 7, 2001 at 3:23 PM, the call identification number appears as follows: 1523_ 10072001_4085551212. When the caller's telephone number is not provided, the dialog manager 104 (FIG. 3) uses a random number as the caller's telephone number.

For each call identification 214, the message header data structure 134 stores a message sent field 216, a recipient's name field 218, a recipient's e-mail address field 220, a caller's name field 222, a caller's subject field 224, a caller's callback telephone number field 226 and a caller's available times field 228.

The message sent field 216 indicates whether an e-mail message associated with the the call identifier was sent. The recipient's name field 218 stores the recipient name 204 that was retrieved from the e-mail address data structure 114 (FIG. 9). The recipient's e-mail address field 220 stores the recipient's e-mail address 206 that was retrieved from the e-mail address data structure 114 (FIG. 9). The caller's name field 222 stores the text of the stated name of the caller. The caller's subject field 224 stores the text of the stated subject. The caller's callback telephone number field 226 stores the stated callback telephone number. The caller's available times field 228 stores the stated times that the caller is available.

The dialog manager 120 retrieves the recipient's name 204 and e-mail address 206 from the electronic mail address data structure 114. The caller's name, caller's subject, caller's callback telephone number and caller's available times, 222, 224, 226, 228, respectively, are populated from the information provided to the dialog manager 104 in response to a series of prompts. Initially, the "message sent" field 216 is populated with a value of "N" for No. If the caller completes the message and approves sending the message, the dialog manager 104 populates the "message sent" field 216 with a "Y" for Yes. Data remains in the message header data structure 134 until removed through use of a utility program.

The dialog manager 104 asks the caller to dictate the message. As the caller dictates the message, corresponding digitized audio data is stored as a voice message 110 in a file in the voice message storage 112. The call identification number is stored together with the voice message 110. Concurrently with the caller's dictation, the speech recognition procedure 116 converts the caller's speech into text and stores the resultant text message together with the call identification number in a text file 118 in the message content storage 120.

When the dictation is complete, the dialog manager 104 asks whether the caller wants to review the text message. If the caller responds affirmatively and wants to review the text message, the dialog manager 104 invokes the text-to-speech conversion procedure 136 to recite the text message to the caller. The dialog manager 104 then asks whether the caller wants to send, edit, replace or discard the text message. If the caller wants to discard the message, the dialog manager 104 terminates the call. If the caller wants to replace the message, the dialog manager 104 asks the caller to dictate the message again. If the caller wants to edit the message, the dialog manager 104 enables the caller to play the voice message under control of the telephone keypad and to verbally replace words. After the caller edits or replaces the voice message, the dialog manager 104 replaces the voice message in voice message storage 1 12 with the modified or new message, using the speech recognition procedure 1 16 to convert newly dictated portions of the voice message into text. The dialog manager 104 then replaces the text message in message content storage 120 with the new message, and again asks whether the caller wants to send, edit, replace or discard the text message.

When the caller indicates that the text message is ready to send, the dialog manager 104 assembles and sends the electronic mail message. To assemble the electronic mail message, the dialog manager 104 retrieves the message header information and part of the message from message header data structure 134, and retrieves the remainder of the message from the message content storage 120. As described above, at the caller's option or on any other appropriate basis, the dialog manager 104 includes the voice message as a file attachment to the electronic mail message. The complete electronic mail message, with a reference to the voice message attachment, if any, is stored temporarily in the electronic mail message storage 138.

To send the electronic mail message, the dialog manager 104 provides the electronic ail system 40 with the electronic mail message contents stored in the electronic mail message storage 138, and commands the electronic mail system 40 to send the message. The dialog manager 104 then changes the message sent field 216 (FIG. 10) in the message header data structure 134 to "Y" to indicate that the message was sent. Finally, the dialog manager 104 terminates the interchange with the caller, and becomes available for the next call.

In a preferred embodiment, the voice-to-electronic mail system 70 uses a multi-tasking operating system that enables the system to simultaneously handle multiple incoming calls.

In an alternate embodiment, some of the message header fields described above are either not use, or are optional. For instance, the caller's available times 228 may not be provided in some embodiments.

FIGS. 11A–11E describe the operation of the voice-to-electronic mail system 30 (FIGS. 1, 3 and 8) in further detail showing the dialog between the caller and the voice-to-electronic mail system. FIGS. 11A–11E will be described with reference to FIG. 3. A dashed box 240 indicates that the enclosed steps are performed by the voice/text switch procedure 102. In step 242, the voice/text switch procedure 102 receives an incoming telephone call from a caller to a called telephone number for a recipient, the call includes a unique call identification number. In step 244, the voice/text switch procedure 102 determines whether the called telephone number is associated with an electronic mail address. The voice/text switch procedure 102 searches the electronic mail address data structure 114 (FIG. 9) to retrieve an electronic mail address associated with the called telephone number. The voice/text switch procedure 102 also retrieves the associated recipient's name from the electronic mail address data structure 114 (FIG. 9). If the voice/text switch procedure 102 does not find a corresponding electronic mail address for the called telephone number, in step 246, the voice/text switch procedure 102 switches the call to the voice mail system 38 (FIG. 1). If the voice/text switch procedure 102 finds an electronic mail address for the called telephone number, in step 248, the voice/text switch procedure 102 stores the associated e-mail address, together with the recipient's name and the call identification number in the message header data structure 134 (FIG. 10). The voice/text switch procedure 102 then passes the call to the dialog manager 104.

The dialog manager 104 conducts a question-and-answer interchange with the caller in a series of prompts and responses. The dialog manager 104 verbally asks the caller questions such as "What is your name?" and makes requests of the caller such as "Please spell your name." The dialog manager's speech is produced using the text-to-speech conversion procedure 136, which speaks many types of words including the caller's name and the subject of the caller's message. Alternately, to prompt the caller, predefined statements and portions of statements can be "spoken" from stored digitized speech. In one embodiment, the caller responds to questions verbally. The caller may respond using words or by spelling the response. For example, the caller may state "Tom Jones" or the caller may spell his name by saying the letters: "T" "O" "M." The dialog manager 104 invokes the speech recognition procedure 116 to recognize the caller's response and converts the caller's verbal statement to text for the dialog manager 104 to process. Alternately, the caller may respond by pressing keys on the telephone keypad. For example, depending on predefined conventions, the caller may press 1 for Yes and 2 for No. To spell a name, the caller may press 8, then 1. The "1" represents that the first letter on key 8, a "T" should be used. When the touch tone keypad is used, the dialog manager 104 invokes the touch tone detector procedure 106 to detect and identify the pressed keys. The dialog manager 104 refers to predefined rules to interpret the meaning of the sequence of key presses.

At step 250, the dialog manager 104 asks whether the caller wants to send text mail to the recipient. If the caller does not want to send text mail to the recipient, in step 246, the dialog manager 104 causes the voice/text switch procedure 102 to switch the call to the voice mail system 38 (FIG. 1).

Determining the Caller's Name

If the caller wants to send text mail to the recipient, the dialog manager 104 proceeds through a sequence of queries to correctly identify the caller's name. In step 252, the dialog manager 104 asks the caller to state their name. In step 254, the dialog manager 104 invokes the speech recognition procedure 116 to recognize and generate caller-name text corresponding to the spoken name. In one embodiment, steps 252 and 254 are performed concurrently. In steps 256–264, the dialog manager 104 verifies the results of the speech recognition procedure 116. In step 256, the dialog manager 104 invokes the text-to-speech procedure 136 to recite the caller-name text to the caller. In step 258, the dialog manager 104 asks whether the recited caller name is correct.

If the recited caller name is not correct, in step 260, the dialog manager 104 prompts the caller to spell their name. In step 262, the dialog manager 104 invokes the text-to-speech procedure 136 to recite the letters of the spelled name to the caller. In step 264, to verify the spelling of the caller's name, the dialog manager 104 asks whether the spelling of the name is correct. If the spelling of the caller's name is not correct, in step 266, the dialog manager 104 causes the speech recognition procedure 116 to load the generic voice files 126, and proceeds to step 270.

When steps 258 or 264 determine that the caller's name is correct, the dialog manager 104 causes the speech recognition procedure 116 to load caller-specific voice files 24 in the voice file data structure 172 that are specific to that caller name, if any, otherwise the speech recognition program 116 loads the generic voice files 126.

In step 270, the dialog manager 104 updates the caller name field 222 of the message header data structure 134 with the caller's name.

Determining the Subject

In steps 272–276, the dialog manager 104 updates the caller's subject field 224 of the message header data structure 134. In step 272, the dialog manager 104 prompts the caller to state the subject of the message. In step 274, the dialog manager 104 invokes the speech recognition procedure 116 to generate subject-text corresponding to the stated subject. The speech recognition procedure 116 generates the subject-text as the caller is stating the subject. Instep 276, the dialog manager 104 stores the subject-text in the caller's subject field 224 of the message header data structure 134.

Selecting Topic-Specific Vocabulary Files

In the next sequence of steps 278–280, to improve the accuracy of the speech recognition of the subsequent message, topic-specific vocabulary files 132, may be selected based on the subject-text. The dialog manager 104 invokes the topic gister procedure 128 to estimate the general topic of the subject-text. For example, words such as "budget," "meeting" and "sales" are associated with a general topic called "general business." The topic gister procedure 128 provides a confidence value that represents a measure of confidence of the estimate of the general topic. When the confidence value exceeds a predefined confidence threshold,the topic g gister procedure 128 causes the speech recognition procedure 116 to load topic-specific vocabulary files 132 for the general topic from vocabulary data structure 130.

The use of topic-specific vocabulary files is an optional feature of the present invention that may not be included in some embodiments.

Determining the Caller's Telephone Number

In steps 282–296, the dialog manager 104 determines the caller's call-back telephone number. In step 282, the dialog manager 104 asks the caller to state a telephone number at which the caller can be reached. In step 284, the dialog manager 104 invokes the speech recognition procedure 116 to recognize and generate caller-telephone-number text representing the stated telephone number. In step 286, the dialog manager 104 invokes the text-to-speech procedure 136 to recite the caller-telephone-number text to the caller. In step 288, the dialog manager 104 asks the caller whether the recited telephone number is correct. If the caller indicates that the telephone number is correct, the dialog manager 104 proceeds to step 296 which will be described below. If the recited telephone number is not correct, the dialog manager 104 allows the user to correct the telephone number using the touch tone keypad. In step 290, the dialog manager 104 prompts the caller to enter the telephone number using the telephone touch tone keypad. The touch tone detector procedure 108 identifies the tones and generates caller-telephone number text representing the telephone number. In step 292, the dialog manager 104 invokes the text-to-speech procedure 136 to recite the caller-telephone-number text to the caller. In step 294, the dialog manager 104 the asks the caller whether the recited telephone number is correct. If the caller indicates that the recited telephone number is correct, the dialog manager 104 proceeds to step 298 which will be described below. If the caller indicates that the recited telephone number is not correct, steps 290–204 are repeated.

In an alternate embodiment, the caller corrects the telephone number verbally, rather than using the touch tone keypad. The dialog manager 104 asks the user to re-state the telephone number and invokes the speech recognition procedure 116 to generate text corresponding to the telephone number.

In step 296, the dialog manager 104 stores the verified telephone number in the caller's callback telephone number field 226 of the message header data structure 134.

Determining When the Caller Can Be Reached

In step 298, the dialog manager 104 prompts the caller to state a time or a range of times during which the caller can be reached at the stated telephone number. In step 300, the dialog manager 104 invokes the speech recognition procedure 116 to generate callback-time text from the caller's response, and stores the callback-time text in the caller's callback telephone number field 226 (FIG. 10) of the message header data structure 134. Exemplary responses include "all," "any," "evenings," "1 p.m." and "11 a.m. to 4 p.m."

The Caller's Message

After gathering the message header data in the message header data structure 134, in step 302, the dialog manager 104 prompts the caller to dictate the message. In step 304, the dialog manager 104 records the caller's speech as a digitized voice message in a voice message file 110 in the voice message storage 112 while the caller is speaking.

Concurrently with recording the caller's message in step 304, in step 306, the dialog manager 104,invokes the speech recognition procedure 116 to recognize the caller's speech as the caller dictates their message. The speech recognition procedure 116 generates message text which is stored in the message text file 118 in the message content storage 118.

In step 308, to allow the caller to verify the message text, the dialog manager 104 plays a prompt asking whether the caller wants to verify the text message 118. If not, in step 312, the dialog manager 104 asks whether the caller wants to play the voice message 110. If so, in step 314, the dialog manager 104 plays the voice message; and, if not, the dialog manager 104 proceeds to step 318.

If the caller's response in step 308 indicates that the caller wants to verify the text message, in step 316, the dialog manager 104 invokes the text-to-speech procedure 136 to recite the message text to the caller.

Sending the Message

In step 318, the dialog manager 104 asks whether the caller wants to send the message. In step 322, when the caller approves sending the electronic mail message, the dialog manager 104 assembles the e-mail message using the contents of the message header data structure 134, the message text file 120 in the message content storage 120 and, when requested or otherwise appropriate, the voice message file 110 in the voice message storage 112. The dialog manager 104 then invokes the electronic mail system 40 (FIG. 1), and commands the electronic mail system 40 (FIG. 1) to send the e-mail message.

If, in step 318, the caller does not want to send the message, the caller may discard, replace or edit the message. In step 324, the dialog manager 104 prompts the caller as to whether the caller wants to edit, replace or discard the message. The dialog manager 104 invokes the speech recognition procedure 116 to determine the caller's response.

In step 326, if the dialog manager determines that the caller wants to edit the message, in step 328, the dialog manager 104 invokes the editor 148. The editor 148 allows the caller to play and edit the voice message file 110 stored in the voice message storage 112. The dialog manager 104 plays the voice message under the caller's control and enables the caller to replace words. While the voice message plays, the caller may press keys on the telephone keypad to stop the message, jump forward or backward in the message, or continue playing the message, similar to controlling an audio tape player. The caller may also replace the last N words of a message, specifying the number of words, N, by pressing one or more touch tone keys. The caller dictates replacement words, which are recognized and converted to text by the speech recognition procedure 116. Editing creates a modified voice message 110 and a modified text message 118, which are stored in the voice message storage 112 and message content storage 120, respectively. When editing is complete, the dialog manager 104 proceeds to step 318 to allow the caller to verify the modified text message, play the modified voice message, and send the resulting electronic mail message 140 to the recipient.

In step 330, if the caller chooses to replace the message, the dialog manager 104 proceeds to step 302 to allow the caller to dictate the message again.

In step 332, if the caller chooses to discard the message, the dialog manager 104 completes and terminates the dialog with the caller, and the text file 118 and voice message 110 for the call are deleted.

Alternate Embodiments

In one alternate embodiment, the electronic mail messages are assembled and sent with header information similar to that described, and with attached voice messages 110, but with little or no message body text. For instance, only the automatically generated first sentence of the message field is sent without the text from the message text file 118. This embodiment effectively adds identifying information to voice messages and provides voice messages with many of the advantages of electronic mail messages. The identifying information enables recipients to group, order and review their voice messages by such identifiers as sender, subject and time, in addition to sequential order based on time of receipt.

In another alternate embodiment, the dialog manager 104 invokes a voice verification procedure 142 to verify the identify of callers (e.g., by comparing voice characteristics of the caller with previously stored voice characteristics of a predetermined caller known to have the identity claimed by the caller) and attach verification notices to the electronic mail messages sent to the recipient. As a result, recipients are provided with increased certainty as to the identity of the message senders, and helps to identify imposters.

In the foregoing description, the voice-to-electronic mail system 30 (FIG. 1) of the recipient is distinct from the electronic mail system 40 (FIG. 1) to which the invention is connected. In an alternate embodiment, the voice-to electronic mail system 30 also includes an electronic mail procedure 144 that performs the functions of the electronic mail system 30 (FIG. 1).

In yet another alternate embodiment, at least two different speech recognition procedures are used. A syntax-by-rule speech recognition procedure 146 recognizes the caller's telephone number and available times. In this embodiment, the speech recognition procedure 116 is a statistical syntax speech recognition procedure and is used to recognize the text of the message subject and message body. In another alternate embodiment, the dialog manager 104 invokes the speech recognition procedure 116 after the caller is done speaking and recognizes the caller's message from the stored voice message 110.

Other alternate embodiments of the verbal interchange between the dialog manager 104 and the caller may be used in the present invention. For example, prompts may be phrased in different ways.

The description places the dialog manager 104 in the active role with the caller as respondent; alternately, the dialog manager 104 allows the caller to have an active role, by stating information without being prompted. For example, a caller initiates a dialog by saying: "This is Tom Jones. Please call this evening about getting together for lunch." The dialog manager 104 identifies and retrieves the caller's name, call-back time and subject without prompting.

In another embodiment, the invention handles situations where the computer system makes errors, the caller responds inappropriately, the speech recognition procedure cannot recognize the caller's speech, the computer system is called by a child, automatic calling machine or other computer system, and so forth. For example, a call from an automatic calling machine may produce the following dialog. The dialog manager 104 (FIG. 3) answers the call and asks the caller: "Do you want to send text mail to Mary Smith?" The automatic calling machine states: "Hello, this is Congressman Brown." The dialog manager replies: "I do not understand. Please say yes or no." The automatic calling machine states: "Calling to ask for your support." The dialog manager replies: "On your telephone keypad, press 1 for yes or 2 for no." The automatic calling machine states: "in the upcoming election." Since the caller has not responded appropriately to the prompts, the dialog manager replies: "Thank you for calling. Goodbye." and terminates the call.

In another example, the voice-to-text system receives a call from a recalcitrant caller. The dialog manager states: "Do you want to send text mail to Mary Smith?" The caller replies: "Hi, Mary. This is Tom." The dialog manger replies: "I do not understand. Please say yes or no." The caller replies: "I don't understand you either." The dialog manager states: "On your telephone keypad, press 1 for yes, or 2 for no." The caller replies: "Who are you?" Since the caller failed to respond appropriately to any of the prompts the dialog manager says: "Thank you for calling. Goodbye." and terminates the call.

In another alternate embodiment, the caller provides the recipient's e-mail address, and the system does not retrieve the e-mail address from the database by looking up the recipient's telephone number. This enables the system to work without receiving the telephone number from the telephone network, or requiring that all recipients be subscribers. To provide the recipient's e-mail address, the dialog manager prompts the caller to state the e-mail address. The caller responds by stating the recipient's e-mail address and the speech recognition engine generates corresponding text. For example, the caller may state: "M Smith at e-mail dot com." If the speech recognition engine does not recognize the response, the dialog manager will prompt the caller to vocally spell the recipient's e-mail address. When the speech recognition engine does does recognize the spelled e-mail address, the dialog manager prompts the caller to spell the e-mail address using the touch tone keypad.

In another embodiment, the present invention is implemented as a computer program product that includes a computer program mechanism embedded in a computer readable storage medium. For instance, the computer program product includes at least a subset of the procedures and data structures shown in FIG. 3 as program modules. These program modules may be stored on a CD-ROM, magnetic disk storage product, or any other computer readable data or program storage product. The program modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of receiving and processing voice messages, comprising:

receiving an audio message from a caller for a recipient identified by a telephone number used by the caller to place a call;

verifying whether the audio message is from a caller that is a predetermined known caller;

retrieving a stored e-mail address associated with the recipient, wherein the e-mail address associated with the recipient was stored prior to receipt of the audio message;

generating a text message from the audio message from the caller; and sending to the recipient, at the recipient's e-mail address, an electronic mail message, including at least a portion of the text message, and a verification notice that indicates that the electronic mail message is from the predetermined known caller.

2. A method of receiving and processing voice messages, comprising:

receiving an audio message from a caller for a recipient identified by a telephone number used by the caller to place a call;

retrieving a stored e-mail address associated with the recipient, wherein the e-mail address associated with the recipient was stored prior to receipt of the audio message;

generating a text message file from the audio message from the caller;

editing the text message file prior to sending the text message file to the recipient, wherein the editing includes converting the text message file to speech for audio review by the caller and enabling the caller to replace user selected portions of the text message file; and sending an electronic mail message, including at least a portion of the text message file, to the recipient at the e-mail address associated with the recipient;

wherein the editing includes verbally specifying new words to be converted to text and inserted into the text message file.

3. A method of sending messages, comprising:

receiving an audio message from a caller for a recipient;
prompting the caller for an audio subject of the message;
generating a text subject from the audio subject;
determining an e-mail address for the recipient;
identifying a specialized vocabulary file identifying a specialized vocabulary file that corresponds to the text subject;
generating a text message file in accordance with the specialized vocabulary file; and
sending an electronic mail message including the text subject and at least a portion of the text message file to the recipient at the recipient's e-mail address.

4. A message system comprising a dialog manager, a voice verification procedure and a speech recognition procedure wherein:

the dialog manager is configured to:
receive an audio message from a caller for a recipient identified by a telephone number used by the caller to place a call, and
retrieve a stored e-mail address associated with the recipient, wherein the e-mail address associated with the recipient was stored prior to receipt of the audio message;

the voice verification procedure is configured to verify whether the audio message is from a caller who is a predetermined known caller;

the speech recognition procedure is configured to generate a text message from the audio message from the caller; and the dialog manager is configured to send to the recipient at the recipient's e-mail address at least a portion of the text message and a verification notice that indicates that the text message is from the predetermined known caller.

5. A message system comprising a dialog manager, a speech recognition procedure and an editor wherein:

the dialog manager is configured to:
receive an audio message from a caller for a recipient identified by a telephone number used by the caller to place a call, and
retrieve a stored e-mail address associated with the recipient, wherein the e-mail address associated with the recipient was stored prior to receipt of the audio message;

the speech recognition procedure is configured to generate a text message file from the audio message from the caller;

the editor is configured to allow the caller to edit the text message file prior to sending the text message file to the recipient, wherein the editing includes converting the text message file to speech for audio review by the caller, enabling the caller to verbally specify new words to be converted to text and inserted into the text message file, and enabling the caller to replace user selected portions of the text message file; and the dialog manager is configured to send the text message file to the recipient at the recipient's e-mail address.

6. A message system comprising a dialog manager, a gister procedure, and a speech recognition procedure wherein:

the dialog manager is configured to:
receive an audio message from a caller for a recipient identified by a telephone number used by the caller to place a call,
retrieve a stored e-mail address associated with the recipient, wherein the e-mail address associated with the recipient was stored prior to receipt of the audio message, and
prompt the caller for an audio subject of the message;

the gister procedure is configured to generate a text subject from the audio subject and to identify a specialized vocabulary file that corresponds to the text subject; and the speech recognition procedure is configured to generate a text message file from the audio message from the caller in accordance with the specialized vocabulary file.

7. A computer program product for use in conjunction with a computer system, the computer program product comprising a computer readable storage medium and a computer program mechanism embedded therein, the computer program mechanism comprising a dialog manager, a voice verification procedure and a speech recognition procedure wherein:

the dialog manager is configured to:
receive an audio message from a caller for a recipient identified by a telephone number used by the caller to place a call, and
retrieve a stored e-mail address associated with the recipient, wherein the e-mail address associated with the recipient was stored prior to receipt of the audio message;

the voice verification procedure is configured to verify whether the audio message is from a caller who is a predetermined known caller;

the speech recognition procedure is configured to generate a text message from the audio message from the caller; and the dialog manager is configured to send to the recipient at the recipient's e-mail address at least a portion of the text message and a verification notice that indicates that the text message is from the predetermined known caller.

8. A computer program product for use in conjunction with a computer system, the computer program product comprising a computer readable storage medium and a computer program mechanism embedded therein, the computer program mechanism comprising a dialog manager, a speech recognition procedure and an editor wherein:

the dialog manager is configured to:
  receive an audio message from a caller for a recipient identified by a telephone number used by the caller to place a call, and
  retrieve a stored e-mail address associated with the recipient, wherein the e-mail address associated with the recipient was stored prior to receipt of the audio message;

the speech recognition procedure is configured to generate a text message file from the audio message from the caller;

the editor is configured to allow the caller to edit the text message file prior to sending the text message file to the recipient, wherein the editing includes converting the text message file to speech for audio review by the caller, enabling the caller to verbally specify new words to be converted to text and inserted into the text message file, and enabling the caller to replace user selected portions of the text message file; and the dialog manager is configured to send the text message file to the recipient at the recipient's e-mail address.

9. A computer program product for use in conjunction with a computer system, the computer program product comprising a computer readable storage medium and a computer program mechanism embedded therein, the computer program mechanism comprising a dialog manager, a gister procedure, and a speech recognition procedure wherein:

the dialog manager is configured to:
  receive an audio message from a caller for a recipient identified by a telephone number used by the caller to place a call,
  retrieve a stored e-mail address associated with the recipient, wherein the e-mail address associated with the recipient was stored prior to receipt of the audio message, and
  prompt the caller for an audio subject of the message;

the gister procedure is configured to generate a text subject from the audio subject and to identify a specialized vocabulary file that corresponds to the text subject; and the speech recognition procedure is configured to generate a text message file from the audio message from the caller in accordance with the specialized vocabulary file.

10. A method of receiving and processing voice messages at a voice mail server, comprising:

storing for each subscriber of a plurality of subscribers an e-mail address associated with the subscriber, wherein the plurality of subscribers comprise a subset of all the subscribers on the voice mail server;

receiving an audio message from a caller for a subscriber identified by a telephone number used by the caller to place a call, wherein the subscriber is one of the plurality of subscribers;

verifying whether the audio message is from a caller that is a predetermined known caller;

retrieving the stored e-mail address associated with the subscriber;

generating a text message from the audio message from the caller; and sending to the subscriber, at the subscriber's e-mail address, an electronic mail message, including at least a portion of the text message, and a verification notice that indicates that the electronic mail message is from the predetermined known caller.

11. A method of receiving and processing voice messages at a voice mail server, comprising:

storing for each subscriber of a plurality of subscribers an e-mail address associated with the subscriber, wherein the plurality of subscribers comprise a subset of all the subscribers on the voice mail server;

receiving an audio message from a caller for a subscriber identified by a telephone number used by the caller to place a call, wherein the subscriber is one of the plurality of subscribers;

retrieving the stored e-mail address associated with the subscriber;

generating a text message file from the audio message from the caller;

editing the text message file prior to sending the text message file to the subscriber, wherein the editing includes converting the text message file to speech for audio review by the caller, enabling the caller to verbally specify new words to be converted to text and inserted into the text message file, and enabling the caller to replace user selected portions of the text message file; and sending an electronic mail message including at least a portion of the text message file to the subscriber at the e-mail address associated with the subscriber.

12. A method receiving and processing voice messages at a voice mail server, comprising:

storing for each subscriber of a plurality of subscribers an e-mail address associated with the subscriber, wherein the plurality of subscribers comprise a subset of all the subscribers on the voice mail server;

receiving an audio message from a caller for a subscriber identified by a telephone number used by the caller to place a call, wherein the subscriber is one of the plurality of subscribers;

retrieving the stored e-mail address associated with the subscriber;

prompting the caller for an audio subject of the message;

generating a text subject from the audio subject; and identifying a specialized vocabulary file that corresponds to the text subject;

generating the text message from the audio message in accordance with the specialized vocabulary file; and sending an electronic mail message including the text subject and at least a portion of the text message to the subscriber at the e-mail address associated with the subscriber.

13. A message system comprising a voice mail server, an e-mail address data structure, a dialog manager, a voice verification procedure and a speech recognition procedure wherein:

the e-mail address data structure contains for each subscriber of a plurality of subscribers an e-mail address associated with the subscriber, wherein the plurality of subscribers comprise a subset of all the subscribers on the voice mail server;

the dialog manager is configured to:
  receive an audio message from a caller for a subscriber identified by a telephone number used by the caller to place a call, and
  retrieve a stored e-mail address associated with the subscriber, wherein the e-mail address associated with the subscriber was stored prior to receipt of the audio message;
the voice verification procedure is configured to verify whether the audio message is from a caller who is a predetermined known caller;
the speech recognition procedure is configured to generate a text message from the audio message from the caller; and
the dialog manager is configured to send to the subscriber at the subscriber's e-mail address at least a portion of the text message and a verification notice that indicates that the text message is from the predetermined known caller.

14. A message system comprising a voice mail server, an e-mail address data structure, a dialog manager, a speech recognition procedure and an editor wherein:
  the e-mail address data structure contains for each subscriber of a plurality of subscribers an e-mail address associated with the subscriber, wherein the plurality of subscribers comprise a subset of all the subscribers on the voice mail server;
  the dialog manager is configured to:
    receive an audio message from a caller for a subscriber identified by a telephone number used by the caller to place a call, and
    retrieve a stored e-mail address associated with the subscriber, wherein the e-mail address associated with the subscriber was stored prior to receipt of the audio message;
  the speech recognition procedure is configured to generate a text message file from the audio message from the caller;
  the editor is configured to allow the caller to edit the text message file prior to sending the text message file to the subscriber, wherein the editing includes converting the text message file to speech for audio review by the caller, enabling the caller to verbally specify new words to be converted to text and inserted into the text message file, and enabling the caller to replace user selected portions of the text message file; and
  the dialog manager is configured to send the text message file to the subscriber at the subscriber's e-mail address.

15. A message system comprising a voice mail server, an e-mail address data structure, a dialog manager, a speech recognition procedure, and a gister procedure wherein:
  the e-mail address data structure contains for each subscriber of a plurality of subscribers an e-mail address associated with the subscriber, wherein the plurality of subscribers comprise a subset of all the subscribers on the voice mail server;
  the dialog manager is configured to:
    receive an audio message from a caller for a subscriber identified by a telephone number used by the caller to place a call;
    retrieve a stored e-mail address associated with the subscriber, wherein the e-mail address associated with the subscriber was stored prior to receipt of the audio message; and
    prompt the caller for an audio subject of the message; and
  the gister procedure is configured to generate a text subject from the audio subject and to identify a specialized vocabulary file that corresponds to the text subject;
  the speech recognition procedure is configured to generate a text message from the audio message from the caller in accordance with the specialized vocabulary file; and
  the dialog manager is configured to send an electronic mail message including the text subject and at least a portion of the text message to the subscriber at the e-mail address associated with the subscriber.

16. A computer program product for use in conjunction with a computer system, the computer program product comprising a computer readable storage medium and a computer program mechanism embedded therein, the computer program mechanism comprising:
  a dialog manager;
  a voice verification procedure;
  a speech recognition procedure; and
  an e-mail address data structure configured to store for each subscriber of a plurality of subscribers an e-mail address associated with the subscriber, wherein the plurality of subscribers comprise a subset of all the subscribers on a voice mail server;
  wherein
  the dialog manager is configured to:
    receive an audio message from a caller for a subscriber identified by a telephone number used by the caller to place a call, and
    retrieve a stored e-mail address associated with the subscriber, wherein the e-mail address associated with the subscriber was stored prior to receipt of the audio message;
  the voice verification procedure is configured to verify whether the audio message is from a caller who is a predetermined known caller;
  the speech recognition procedure is configured to generate a text message from the audio message from the caller; and
  the dialog manager is configured to send to the subscriber at the subscriber's e-mail address at least a portion of the text message and a verification notice that indicates that the text message is from the predetermined known caller.

17. A computer program product for use in conjunction with a computer system, the computer program product comprising a computer readable storage medium and a computer program mechanism embedded therein, the computer program mechanism comprising:
  a dialog manager;
  a speech recognition procedure;
  an editor; and
  an e-mail address data structure configured to store for each subscriber of a plurality of subscribers an e-mail address associated with the subscriber, wherein the plurality of subscribers comprise a subset of all the subscribers on a voice mail server; wherein
  the dialog manager is configured to:
    receive an audio message from a caller for a subscriber identified by a telephone number used by the caller to place a call, and
    retrieve a stored e-mail address associated with the subscriber, wherein the e-mail address associated with the subscriber was stored prior to receipt of the audio message;

the speech recognition procedure is configured to generate a text message file from the audio message from the caller;

the editor is configured to allow the caller to edit the text message file prior to sending the text message file to the subscriber, wherein the editing includes converting the text message file to speech for audio review by the caller, enabling the caller to verbally specify new words to be converted to text and inserted into the text message file, and enabling the caller to replace user selected portions of the text message file; and the dialog manager is configured to send the text message file to the subscriber at the subscriber's e-mail address.

18. A computer program product for use in conjunction with a computer system, the computer program product comprising a computer readable storage medium and a computer program mechanism embedded therein, the computer program mechanism comprising:

a dialog manager;

a speech recognition procedure; and an e-mail address data structure configured to store for each subscriber of a plurality of subscribers an e-mail address associated with the subscriber, wherein the plurality of subscribers comprise a subset of all the subscribers on a voice mail server wherein:

the dialog manager is configured to:
- receive an audio message from a caller for a subscriber identified by a telephone number used by the caller to place a call;
- retrieve a stored e-mail address associated with the subscriber, wherein the e-mail address associated with the subscriber was stored prior to receipt of the audio message; and
- prompt the caller for an audio subject of the message; and the gister procedure is configured to generate a text subject from the audio subject and to identify a specialized vocabulary file that corresponds to the text subject;

the speech recognition procedure is configured to generate a text message from the audio message from the caller in accordance with the specialized vocabulary file; and the dialog manager is configured to send an electronic mail message including the text subject and at least a portion of the text message to the subscriber at the e-mail address associated with the subscriber.

* * * * *